United States Patent [19]
Dotson et al.

[11] Patent Number: 4,828,102
[45] Date of Patent: May 9, 1989

[54] CARGO CONVEYOR SYSTEM

[75] Inventors: Richard N. Dotson, Salem; Bruce L. Brewer, Alliance, both of Ohio

[73] Assignee: Custom Technologies, Inc., Beloit, Ohio

[21] Appl. No.: 150,822

[22] Filed: Feb. 1, 1988

[51] Int. Cl.[4] ............................................. B65G 15/26
[52] U.S. Cl. ................................... 198/588; 414/278; 414/283
[58] Field of Search ...................... 198/585, 587–589, 198/606, 364, 369, 314–316.1, 318; 414/277–279, 281, 283, 398

[56] References Cited

U.S. PATENT DOCUMENTS

| | | | |
|---|---|---|---|
| 2,721,645 | 10/1955 | Eberle | 198/101 |
| 3,651,963 | 3/1972 | McWilliams | 198/318 |
| 3,928,114 | 12/1975 | Aylon | 156/351 |
| 4,014,428 | 3/1977 | Ossbahr | 198/345 |
| 4,133,436 | 1/1979 | Dahm | 414/281 |
| 4,239,436 | 12/1980 | Wildenaur | 414/278 |
| 4,349,097 | 9/1982 | Curti | 198/369 |

FOREIGN PATENT DOCUMENTS

| | | | |
|---|---|---|---|
| 958670 | 12/1974 | Canada | 198/587 |
| 1054905 | 4/1959 | Fed. Rep. of Germany | 198/589 |
| 2520565 | 11/1976 | Fed. Rep. of Germany | 198/314 |
| 82720 | 7/1981 | Japan | 414/278 |
| 308937 | 9/1971 | U.S.S.R. | 198/587 |

Primary Examiner—Joseph E. Valenza
Attorney, Agent, or Firm—Renner, Kenner, Greive, Bobak, Taylor & Weber

[57] ABSTRACT

A conveyor system for warehouses and the like incorporates a movable gantry (13) which carries a first conveyor boom (22). Similarly, a second conveyor boom assembly (20, 57) is carried by the gantry (13) for rotation relative to the gantry (13) and the first conveyor boom (22). A gantry turntable (33) is interposed between the first conveyor boom (22) and the second conveyor boom assembly (20, 57), and is rotatably positionable relative thereto.

25 Claims, 3 Drawing Sheets

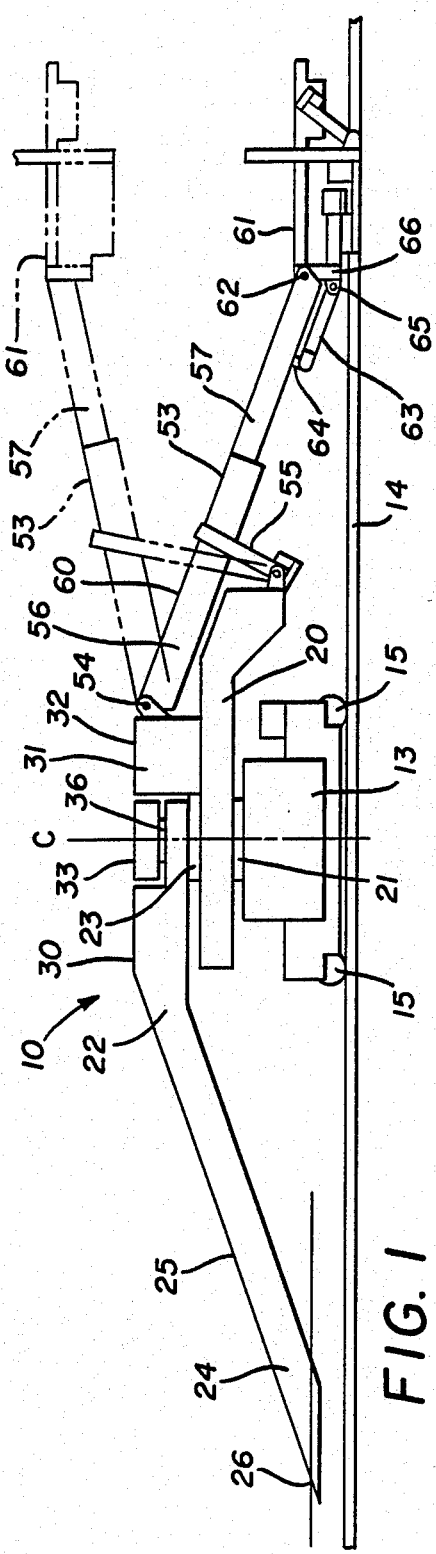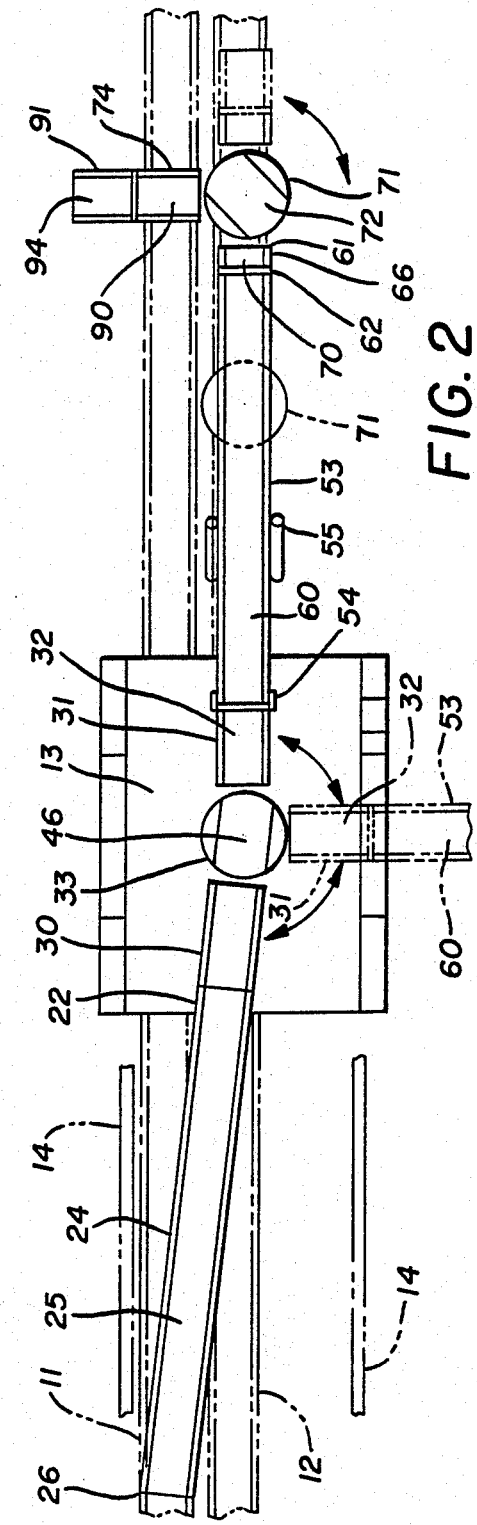

CARGO CONVEYOR SYSTEM

TECHNICAL FIELD

The present invention relates generally to conveyor systems. More particularly, the present invention relates to a conveyor system for handling cargo in warehouses and the like. Specifically, the present invention relates to a roving conveyor system to interface with other fixed conveyor systems of a warehouse to facilitate transportation of cargo between a cargo storage area and the other conveyor systems. Furthermore, the present invention relates to a cargo handling conveyor system wherein the overall structure is movable relative to a cargo storage area thereby providing easy access to a greater amount of the storage area.

BACKGROUND ART

Cargo handling systems employing conveyors are quite common in storage warehouses and the like. Such systems generally employ a continuously moving conveyor belt on which travels the material being handled, which material may be in the form of individual articles or boxes, bags or similar bundles. In more elaborate systems, a plurality of conveyor belts, traveling in different directions, are employed, such that material can be transported simultaneously to various locations about the warehouse.

However, where such multi-directional conveyor systems are desired and employed, they are usually not fully reversible resulting in limited usability of the system. Because the change in direction is most often accomplished by merely permitting the cargo to drop from a conveyor traveling in one direction to a second conveyor traveling in an angular direction, the possibility of reversing the travel of the system, as is often desired, does not exist.

Furthermore, in warehouses having most types of known conveyor systems, workers are required to add and remove material from the continuously moving conveyor belt at the appropriate locations. The workers also must transport the material between the conveyor belt and the physical location where the material is stored.

When the material is quite heavy and/or when the distance between the conveyor and the physical storage location is great, the workers are strained to keep the material handling rate as high as possible. As a result, more workers or additional equipment, such as fork-lift trucks, are required to keep up with the flow of material on the continuously moving conveyor. Alternatively, additional conveyor systems can be installed thereby minimizing the distances from the various physical storage areas. However, such additional conveyor systems are costly, require additional floor space otherwise available for storage, and do not resolve the problems the worker faces when handling heavy material.

Despite the many warehouse facilities in existence, and the continuing need to handle material efficiently, with minimal man-power, no known material handling system is available to efficiently transport material between a continually moving conveyor and a storage area or cargo carrier, particularly if the material is heavy and/or the distance from the conveyor is great.

DISCLOSURE OF THE INVENTION

It is, therefore, a primary object of the present invention to provide a conveyor system for handling cargo or similar materials.

It is further object of the present invention to provide a conveyor system, as above, which is usable with existing conveyor systems in warehouses and the like.

It is another object of the present invention to provide a conveyor system, as above, which is fully reversible to facilitate transporting cargo or similar materials between the existing conveyor systems and a storage area or cargo carrier.

It is yet a further object of the present invention to provide a conveyor system, as above, which is mobile throughout a warehouse.

It is still another object of the present invention to provide a conveyor system, as above, having positionable conveyors to provide access to storage areas, and the like, remote from an existing conveyor system.

These and other objects of the invention, as well as the advantages thereof over existing and prior art forms, which will be apparent in view of the following specification, are accomplished by means hereinafter described and claimed.

In general, a system for conveying cargo or the like, according to the concept of the present invention, includes a movable gantry and a first conveyor boom carried by the gantry. Similarly, a second conveyor boom is carried by the gantry for rotation relative to the gantry and the first conveyor boom. A first turntable is interposed between the first conveyor boom and the second conveyor boom, and is rotatably positionable relative thereto.

A method for handling cargo on a conveyor system, according to the concept of the present invention, and having a first conveyor, a second conveyor and a turntable conveyor interposed therebetween includes the step of positioning the second conveyor relative to the first conveyor. The orientation of the first conveyor relative to the second conveyor is determined and the turntable conveyor is thereby oriented relative to the first and second conveyors.

An exemplary, preferred embodiment of a conveyor system, incorporating the concept of the present invention, is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 1 is a schematic elevational view of a cargo conveyor system embodying the concept of the present invention;

FIG. 2 is a schematic top plan view of the cargo conveyor system of FIG. 1;

EXEMPLARY EMBODIMENT FOR CARRYING OUT THE INVENTION

Figure 3:
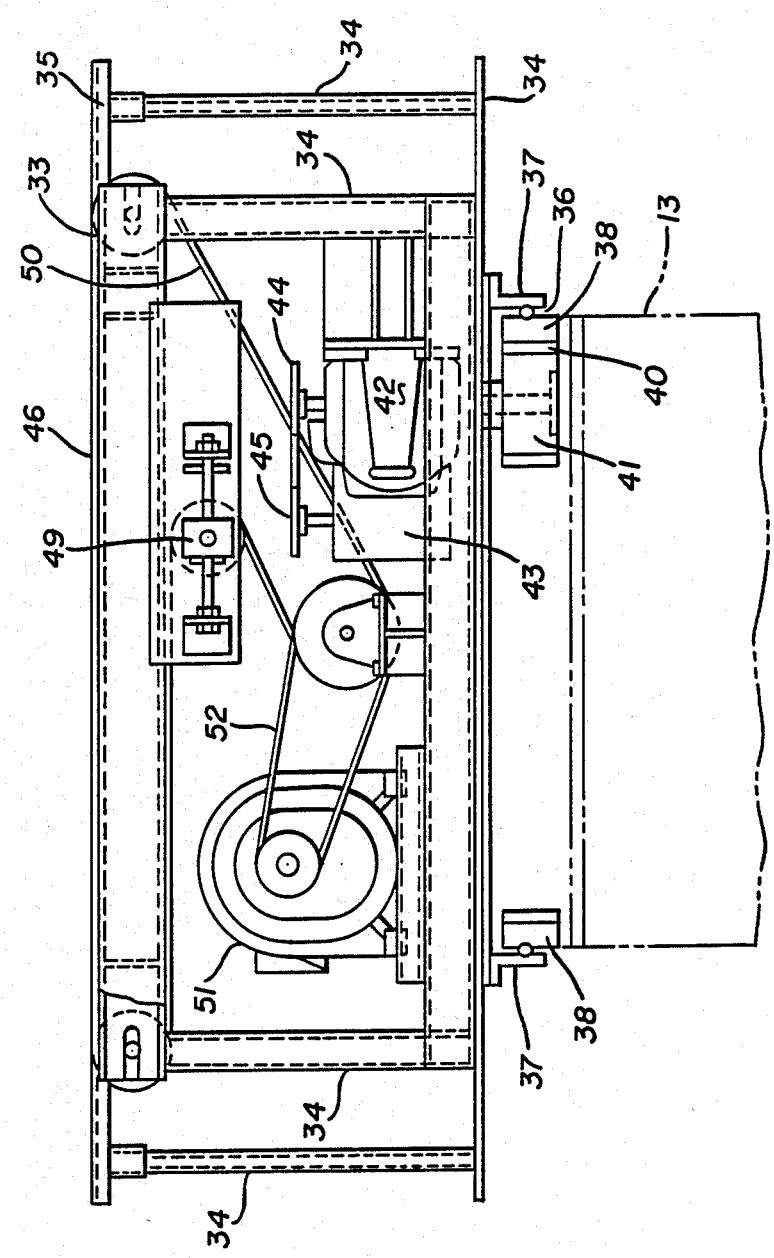
FIG. 3 is an enlarged fragmentary elevational view of the gantry turntable of the cargo conveyor system of FIG. 1; and, FIG. 4 is an enlarged fragmentary elevational view of the boom platform of the cargo conveyor system of FIG. 1.

A conveyor system according to the concept of the present invention, and suitable for handling cargo and the like, is indicated generally by the numeral 10 in FIG. 1 of the accompanying drawings. The cargo conveyor system 10 is depicted in a warehouse environment, interfacing with a pair of conveyors 11 and 12 moving in opposite directions, as depicted in FIG. 2. Generally, such conveyors 11 and 12 travel throughout the warehouse, or interface with a conveyor network, to move cargo or similar material between the various areas of the warehouse and cargo carriers.

The cargo conveyor system 10 includes a mobile gantry 13 which can travel throughout the warehouse. Preferably, gantry 13 straddles conveyors 11, 12 and is guided by rails 14 on which drive wheels 15 ride. In this manner, the cargo conveyor system 10 can travel throughout the regions of the warehouse accessed by conveyors 11, 12.

Gantry 13 may be positioned adjacent conveyors 11, 12 or distant therefrom, as opposed to straddling the same. Likewise, gantry 13 may be guided other than by rails 14, or it may be freely controlled and steered by an operator. The advantages of the embodiment disclosed in the drawings are that the cargo carrier system 10 remains at all times functionally positioned relative to conveyors 11, 12. Furthermore, by straddling conveyors 11, 12, minimal additional floor space is required for the cargo conveyor system 10. Rails 14 also may be used to carry suitable conductors to provide power to the cargo carrier system 10 and to interface electrically the cargo carrier system 10 with a central controller, if desired, as would be known in the art.

Preferably, drive wheels 15 are driven by a suitable prime mover, for example electric motors, to translate the cargo conveyor system 10 along rails 14, as depicted in FIG. 1. Such motors may be powered internally, as by onboard batteries, or they may be powered from an external source as discussed hereinabove.

A base 20 is rotatably carried on gantry 13, for rotation about a vertical axis C, as shown in FIG. 2, using a suitable bearing structure 21. Such bearing structure 21 would be well known to one skilled in the art such that a detailed discussion need not be presented herein. It is expected, of course, that bearing structure 21 be sufficiently sized to handle the thrust and radial loads transmitted by base 20. Bearing structure 21 preferably also includes suitable actuating means to facilitate rotation of base 20 relative to gantry 13. Such actuating means would be well known to the skilled artisan and may include a ring and pinion gear assembly with a suitable prime mover. Of course, it may be desirable not to have an actuating means and, instead, to allow the operator to move and position base 20 by hand. In any event, it is preferred that base 20 can rotate at least approximately 330° about vertical axis C, approximately 165° to either side of the longitudinal axis of gantry 13. The actual limits of rotation will depend on the requirements of the installation.

A boom 22 is rotatably mounted on gantry 13 to rotate coaxially relative to base 20. A suitable bearing structure 23 provides for such rotation and may be identical to bearing structure 21 discussed hereinabove. While boom 22 rotates coaxially relative to base 20, it is preferred that the two rotate independently of each other. Accordingly, it is preferred that bearing structure 23 and any corresponding actuating means, if so desired, be mounted on the superstructure of gantry 13. It, likewise, is preferred that boom 22 be capable of rotating at least approximately 240° about vertical axis C, approximately 120° to either side of the longitudinal axis of gantry 13, and generally diametrically opposite the rotation of base 20. As with base 20, the limits of rotation will depend on the requirements of the installation.

Boom 22 includes a downwardly inclined leg 24 forming a cantilever frame structure for a conveyor belt assembly 25. Such a conveyor belt assembly 25 is well known in the material handling industry and need not be described in detail herein. It is preferred that conveyor belt assembly 25 be capable of reversible direction of travel, as will be appreciated hereinbelow. It also is preferred that conveyor belt assembly 25 extend along the full length of boom 22 and that the lowermost end 26 of boom 22 be suitably positionable above warehouse conveyors 11, 12 to interface therewith for handling of cargo, as would be appreciated by one skilled in the art.

The uppermost end 30 of boom 22 presents a substantially planar region on which conveyor belt assembly 25 also is carried. Upper end 30 aligns elevationally with a similar upper surface 31 of base 20. A conveyor belt assembly 32 is incorporated onto upper surface 31. Again, conveyor belt assembly 32 is a typical conveyor capable of reversible direction of travel.

Interposed between base 20 and boom 22, and aligned elevationally with upper end 30 of boom 22 and upper surface 31 of base 20, is a gantry turntable assembly 33. The construction of turntable 33 may be more fully considered and described with reference to FIG. 3.

Specifically, turntable 33 includes a suitable framework 34 supporting a platen 35. Turntable 33 is carried by gantry 13 to be coaxially rotatable relative to base 20 and boom 22 using a suitable bearing structure 36 similar to bearing structures 21 and 23 as heretofore described. As depicted in FIG. 3, an exemplary bearing structure 36 may have the outer race 37 thereof secured to the bottom of framework 34 and an inner race 38 secured to gantry 13. Inner race 38 also may define an internal ring gear 40 about the inner periphery thereof. Ring gear 40 may interface with a suitable pinion gear 41 coupled to an electric gearmotor 42 carried by framework 34. Such an arrangement provides a suitable actuator to control the rotational movement of turntable 33, as would be appreciated by one skilled in the art. A conventional angular position encoder 43 is operatively interconnected with the output shaft of gearmotor 42 as by mating gears 44 and 45. In this manner, the angular position of turntable 33 relative to gantry 13 can accurately be determined, as would be appreciated by the skilled artisan in the field. It should be appreciated that the foregoing assembly presents an effective actuator to control the rotational movement of turntable 33. In like fashion, similar assemblies may be employed as the respective actuators for base 20 and boom 22, heretofore discussed. Such actuators may not only control the movement of the base 20 and boom 22, but also will determine the respective angular positions thereof for purposes which will be appreciated hereinbelow.

Turntable 33 includes a suitable conveyor belt assembly 46. As depicted in FIG. 3, conveyor belt assembly 46 may be a typical conveyor system including a continuous conveyor belt 50 operatively interconnected to a suitable motor 51 as by drive belt 52. A typical slack adjuster 49 is provided to maintain the appropriate tension in conveyor belt 50. Conveyor belt assembly 46 preferably is capable of reversible direction of travel as will be appreciated hereinbelow. The specific structure and components of conveyor belt assembly 46, including the controllers therefore, are all well known to those skilled in the art of conveyors and need not be embellished upon herein. The concept of the present invention is attainable using a wide variety of conveyor assemblies and should not be limited to any one conveyor assembly disclosed herein.

Referring again to FIG. 1, an extendable conveyor 53 is pivotally connected to the radially distal end of upper surface 31 of base 20 as by hinge 54 so as to be selectively movable to a variety of discharge levels as shown in FIG. 1. Extendable conveyor 53 is rotated about hinge 54 by one or more suitably sized boom actuators 55, interposed between base 20 and extendable conveyor 53. Boom actuators 55 may be hydraulic cylinders or, more preferably, electromechanical cylinders capable of pivoting extendable conveyor 53 through an arc of approximately 40°, although this may vary according to the needs of the user.

Extendable conveyor 53 includes a fixed boom 56 and a retractable boom 57 telescoped to fixed boom 56. A suitable, reversible conveyor belt assembly 60, similar to those heretofore discussed, extends along substantially the full length of extendable conveyor 53 with suitable slack adjustment to permit the conveyor belt assembly 60 to remain operational through the range of extension of extendable conveyor 53, which may be approximately 13 feet (3.9 m). While different extendable conveyors 53 may be employed to meet the needs of the user, for purposes of this disclosure, one suitable type of conveyor has been found to be the ADJUSTOVEYOR extendable conveyor, manufactured by Stewart-Glapat Corp. of Zanesville, Ohio.

Figure 4:
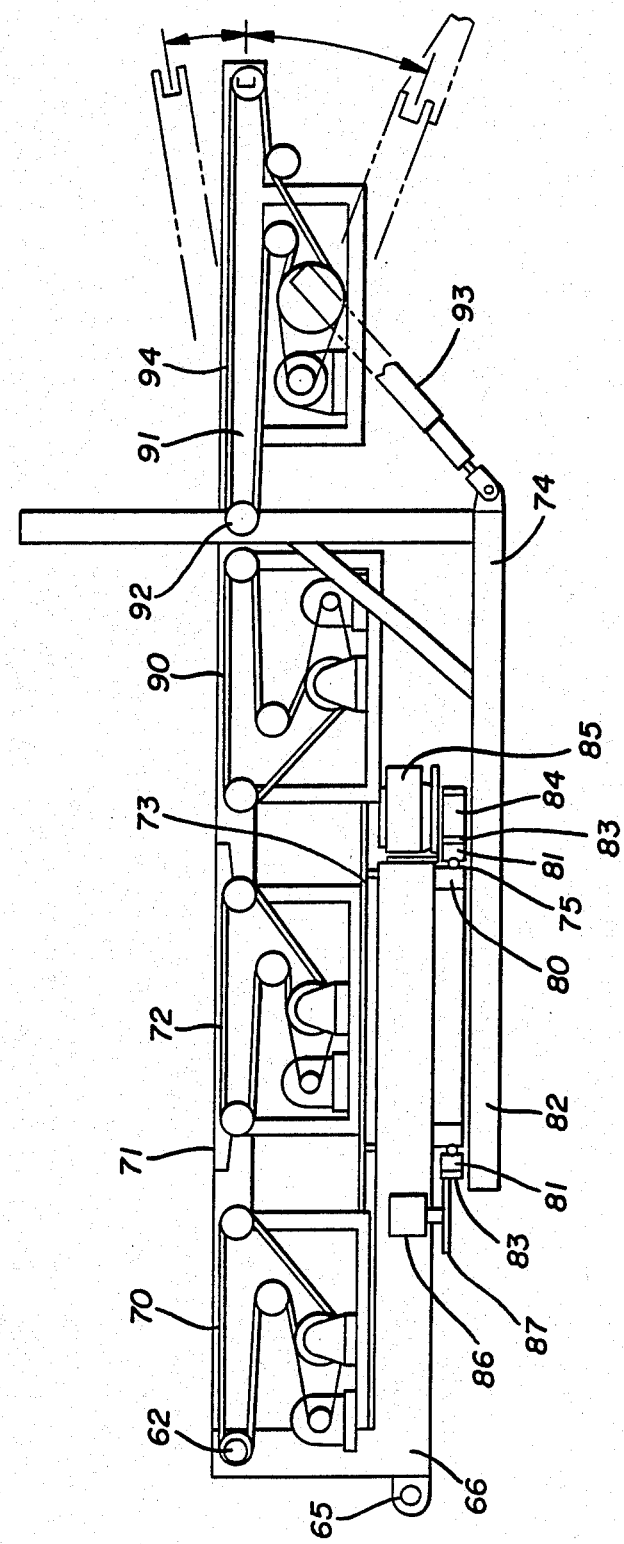

The outermost end of extendable conveyor 53 carries a boom platform 61. As depicted in FIG. 1, boom platform 61 is pivotably mounted to the distal end of retractable boom 57 by hinge pin 62. A suitable actuator 63, preferably hydraulic or electromechanical, is suitably connected between a clevis 64 on retractable boom 57 and a clevis 65 on the support frame 66 of boom platform 61, as depicted in FIG. 4, to regulate the orientation of boom platform 61 relative to extendable conveyor 53. As would be appreciated by one skilled in the art, actuator 63 may be controlled by a suitable tilt sensor affixed to boom platform 61 such that actuator 63 is appropriately energized to maintain boom platform 61 substantially level at all positions of extendable conveyor 53. Of course, suitable manual control of actuator 63 may be provided to enable boom platform 61 to be positioned in other than a horizontal position to meet the needs of the user.

A conveyor belt assembly 70 may be provided on support frame 66 to interface with conveyor belt assembly 60 of extendable conveyor 53. Conveyor belt assembly 70 may be identical in structure and operation as conveyor belt assembly 32 of base 20.

Similarly, a platform turntable 71, which can be identical to gantry turntable 33, includes a similar conveyor belt assembly 72 which can be suitably mounted on support frame 66 with a bearing structure 73 which may be identical to bearing structure 36. As such, the specific structure of platform turntable 71, conveyor belt assembly 72, or bearing structure 73 need not be described in detail herein with the understanding that such are identical to gantry turntable 33, conveyor belt assembly 46 and bearing structure 36, respectively, unless otherwise indicated.

Support frame 66 also carries a swing frame 74 underhung therefrom. A suitable bearing structure 75 permits swing frame 74 to rotate relative to support frame 66 along an axis common with platform turntable 71. Bearing structure 75 may be identical to any of the bearing structures heretofore disclosed and described. As depicted in FIG. 4, bearing structure 75 may include an inner race 80 secured to the bottom of support frame 66. An outer race 81 is secured to the horizontal leg 82 of swing frame 74. The outer periphery of outer race 81 also may define an external ring gear 83 which mates with a suitable pinion gear 84, coupled to an electric gearmotor 85 mounted on support frame 66.

A conventional angular position encoder 86 is operatively interconnected with external ring gear 83 by gear 87. Accordingly, the angular position of swing frame 74 relative to support frame 66 can be determined, and, in conjunction with gearmotor 85, can be controlled. Of course, the foregoing describes an effective embodiment enabling and controlling the rotational movement of swing frame 74, but it is not the exclusive embodiment. Indeed, the structures which permit rotation of turntables 33 and 71, or those of base 20 and boom 22 may all be similar in configuration and operation, as would be appreciated by one skilled in the art.

Swing frame 74 carries a conveyor belt assembly 90 similar to conveyor belt assembly 70, to interface with conveyor belt assembly 72 of platform turntable 71. A pivotal deck 91 is affixed to the distal end of swing frame 74 by a suitable hinge 92. An actuator 93, again preferably hydraulic or electromechanical, is operatively interconnected between deck 91 and swing frame 74 to pivot deck 91 about hinge 92 as may be desired by the user. It should be appreciated that deck 91 provides a final adjustable platform which may be positioned suitably to facilitate handling of cargo by the worker, as will be discussed hereinbelow. While the range through which deck 91 may be positioned will vary depending upon the needs of the user, it has been found to be desirable for deck 91 to pivot from approximately 10° above a horizontal plane to approximately 20° therebelow. Deck 91 also may include a conveyor belt assembly 94 similar to conveyor belt assembly 90 and capable of interfacing therewith.

The foregoing provides a general description of the overall structure of a cargo conveyor system 10 embodying the concept of the present invention. However, to more fully understand and appreciate the present invention, it is desirable to consider the operation of the same in conjunction with the handling of cargo. Discussion will be directed to a cargo conveyor system 10 installed in a warehouse having warehouse conveyors 11 and 12 traveling in opposite directions. As previously discussed herein, rails 14 are provided on either side of warehouse conveyors 11 and 12 and gantry 13 of the cargo conveyor system 10 is suitably positioned to travel therealong.

The cargo conveyor system 10 is first positioned along rails 14 to be in the general vicinity of the warehouse where cargo will be handled. Boom 22 is then positioned such that lower end 26 of leg 24 is positioned to interface with the appropriate warehouse conveyor, for example the outbound conveyor 11. Boom platform 61 is positioned adjacent to the cargo in the warehouse that will be unloaded. Positioning of boom platform 61 is accomplished by rotation of base 20; raising or lowering, and extending or retracting retractable boom 57; pivoting of swing frame 74; and raising or lowering of deck 91. As discussed hereinabove, such positioning of the components of the cargo conveyor system 10 can be accomplished manually or through use of suitable controls mounted on gantry 13 or elsewhere, as would be appreciated by the skilled artisan. The purpose of the positioning is to achieve the minimal distance possible between the end of deck 91 and the area where the cargo is stored in the warehouse or the cargo area of a carrier, such as a railcar or a truck trailer, for example.

Orientation of gantry turntable 33 and platform turntable 71 is effected automatically and simultaneously with the positioning of base 20 and boom 22, for gantry turntable 33, and swing frame 74, for platform turntable 71. Specifically, with reference to FIG. 2 and gantry turntable 33, the interior angle defined by the position of base 20 and boom 22 is determined by the respective angular position encoders as heretofore discussed. The signals from these encoders may be fed into a suitable logic controller, of a type well known in the art, which then controls the positioning of gantry turntable 33 such that the line of travel of conveyor belt assembly 46 preferably is oriented at an angle which is a percentage of the supplement of the angle defined by the orientation of boom 22 relative to base 20. Such percentage is predetermined by the operator and is usually dictated by the type of cargo being conveyed.

In similar fashion, as hereinabove discussed, a suitable angular position encoder determines the position of swing frame 74 relative to support frame 66. The signal, likewise, is fed to the logic controller which in turn positions platform turntable 71 such that the line of travel of conveyor belt assembly 72 preferably is oriented at an angle which is a percentage of the supplement of the angle defined by the orientation of swing frame 74 relative to support frame 66. Again, such percentage is determined by the operator and is usually dictated by the type of cargo being conveyed.

When the cargo conveyor system 10 has been positioned properly, it is energized to run in the proper mode—for example a discharge mode. All the conveyor assemblies heretofore discussed will travel in the same general direction at approximately the same speed, as would be appreciated by one skilled in the art.

With the cargo conveyor system 10 operating in this fashion, cargo can be removed from the storage area of the warehouse. Specifically, the warehouse worker places the cargo, in the form of bundles or boxes or the like, onto conveyor belt assembly 94 of deck 91. From there the cargo travels onto conveyor belt assembly 90 to conveyor belt assembly 72 of platform turntable 71; and then onto conveyor belt 70 to retractable boom 57. Conveyor belt assembly 60 moves the cargo along to conveyor belt assembly 32 on base 20 which in turn transfers the cargo to conveyor belt assembly 46 of gantry turntable 33. The cargo is then routed to conveyor belt assembly 25 of boom 22 which deposits it onto outboard conveyor 11 of the warehouse conveyor network for routing to another area of the warehouse.

It should be appreciated that, to receive inbound cargo for storage in the warehouse, the foregoing operation is simply reversed—with all the conveyor assemblies traveling in the reversed, inbound direction. Boom 22 is positioned such that lower end 26 aligns with inbound warehouse conveyor 12 to receive cargo therefrom. Thereafter, the warehouse worker removes the cargo from conveyor belt assembly 90 of deck 91 and places it as desired for storage or subsequent handling.

The foregoing provides one exemplary embodiment of a conveyor system incorporating the concept of the present invention. It should be evident that alterations and modifications, which are obvious to one skilled in the art, can be made to the foregoing disclosed embodiment without departing from the concept of the invention. Indeed, it may be desirable to have more or less turntables, retractable booms, conveyors or articulated members than those disclosed herein, to meet the requirements of a specific user. Likewise, the manner in which the gantry travels, or the cargo conveyor system is powered or controlled, can be modified to meet the specific needs of the user.

Therefore, it should be appreciated that a conveyor system embodying the concept of the present invention disclosed herein provides an efficient and flexible manner for handling and transporting any materials such as cargo, including bags, bundles, boxes and the like in a warehouse environment. Accordingly, it should be evident that a cargo conveyor system as disclosed herein carries out the various objects of the invention and otherwise constitutes an advantageous contribution to the art.

We claim:

1. A conveyor system for cargo or the like, comprising:
   movable gantry means;
   first conveyor boom means carried by said gantry means;
   second conveyor boom means carried by said gantry means for rotation relative to said gantry means and said first conveyor boom means;
   first turntable means interposed between, and rotatably positionable relative to, said first conveyor boom means and said second conveyor boom means;
   means selectively to rotate said first turntable means; and
   sensor means to determine the angular orientation of said first turntable means relative to said first boom means and said second boom means.

2. A conveyor system, according to claim 1, wherein said first conveyor boom means includes frame means depending from said gantry means and first conveyor means carried by said frame means.

3. A conveyor system, according 2, wherein said second conveyor boom means includes base means rotatably carried by said gantry means; a boom arm connected to said base means and having a distal end; and second conveyor means carried by said boom arm.

4. A conveyor system, according to claim 3, wherein said first turntable means includes a framework; bearing means rotatably carrying said framework; and third conveyor means carried by said framework.

5. A conveyor system, according to claim 4, wherein said means selectively to rotate includes motor means to rotate said framework.

6. A conveyor system, according to claim 3, further comprising hinge means pivotably connecting said boom arm to said base means; and boom actuator means to selectively pivot said boom arm about said hinge means.

7. A conveyor system, according to claim 6, further comprising platform means carried at said distal end of said boom arm; and means to position said platform means relative to said boom arm.

8. A conveyor system, according to claim 7, wherein said platform means includes support frame means secured to said boom arm; swing frame means rotatably carried by said support frame means; and second turntable means rotatably positionable relative to said support frame means and said swing frame means and having a fourth conveyor means.

9. A conveyor system, according to claim 8, further comprising means to position said swing frame relative to said support frame.

10. A conveyor system, according to claim 9, wherein said means to position said swing frame includes motor means selectively to rotate said swing frame relative to said support frame and sensor means to determine the angular orientation of said swing frame relative to said support frame.

11. A method for handling material on a conveyor system having a first conveyor, a second conveyor and a turntable conveyor interposed therebetween comprising the steps of:
   positioning the second conveyor relative to the first conveyor;
   sensing the orientation of the first conveyor relative to the second conveyor; and
   orienting the turntable conveyor relative to the sensed position of the first and second conveyors.

12. A method, according to claim 11, wherein the first conveyor is fixed, said step of positioning the second conveyor includes rotating the second conveyor relative to the first conveyor.

13. A method, according to claim 11, wherein the first conveyor is movable, said step of positioning the second conveyor includes moving the first conveyor to a preselected position and rotating the second conveyor relative to the first conveyor.

14. A method, according to claim 11, wherein the turntable is oriented in response to the orientation of the first and second conveyor.

15. A method, according to claim 14, wherein the turntable conveyor is oriented at an angle less than the supplement of the angle defined by the orientation of the second conveyor relative to the first conveyor.

16. A conveyor system for cargo or the like, comprising:
   movable gantry means;
   first conveyor boom means carried by said gantry means;
   second conveyor boom means carried by said gantry means for rotation relative to said gantry means and said first conveyor boom means;
   first turntable means interposed between, and rotatably positionable relative to, said first conveyor boom means and said second conveyor boom means; and
   platform means carried by said second conveyor boom means and having swing frame means rotatably positionable relative to said second conveyor boom means, and further having second turntable means rotatably positionable relative to said second conveyor boom and said swing frame means.

17. A conveyor system, according to claim 16, wherein said first conveyor boom means includes frame means depending from said gantry means and first conveyor means carried by said frame means.

18. A conveyor system, according to claim 17, wherein said second conveyor boom means includes base means rotatably carried by said gantry means; a boom arm connected to said base means and having a distal end; and second conveyor means carried by said boom arm.

19. A conveyor system, according to claim 18, wherein said first turntable means includes a framework; bearing means rotatably carrying said framework; third conveyor means carried by said framework; and means to rotatably position said framework relative to said first boom means and said second boom means.

20. A conveyor system, according to claim 19, wherein said means to rotatably position includes motor means selectively to rotate said framework and sensor means to determine the angular orientation of said framework relative to said first boom means and said second boom means.

21. A conveyor system, according to claim 18, further comprising hinge means pivotably connecting said boom arm to said base means; and boom actuator means to selectively pivot said boom arm about said hinge means.

22. A conveyor system, according to claim 21, wherein said platform means is carried at said distal end of said boom arm and further comprising means to position said platform means relative to said boom arm.

23. A conveyor system, according to claim 22, wherein said platform means further includes support frame means secured to said boom arm, said swing frame means being rotatably carried by said support frame means.

24. A conveyor system, according to claim 23, further comprising means to position said swing frame relative to said support frame.

25. A conveyor system, according to claim 24, wherein said means to position said swing frame includes motor means selectively to rotate said swing frame relative to said support frame and sensor means to determine the angular orientation of said swing frame relative to said support frame.

* * * * *